US011235889B2

(12) United States Patent
Benítez Guerrero et al.

(10) Patent No.: US 11,235,889 B2
(45) Date of Patent: Feb. 1, 2022

(54) SYSTEM FOR WARNING AN OPEN STATE OF A TWO-PART FAN COWL

(71) Applicant: AIRBUS DEFENCE AND SPACE, S.A.U., Madrid (ES)

(72) Inventors: Francisco José Benítez Guerrero, Madrid (ES); Yolanda Marcos Martín, Madrid (ES)

(73) Assignee: AIRBUS DEFENCE AND SPACE, S.A.U., Madrid (ES)

(*) Notice: Subject to any disclaimer, the term of this patent is extended or adjusted under 35 U.S.C. 154(b) by 59 days.

(21) Appl. No.: 16/781,404

(22) Filed: Feb. 4, 2020

(65) Prior Publication Data
US 2020/0247555 A1 Aug. 6, 2020

(30) Foreign Application Priority Data

Feb. 5, 2019 (EP) .................................... 19382082

(51) Int. Cl.
| *F01D 25/24* | (2006.01) |
|---|---|
| *B64D 47/02* | (2006.01) |
| *B64D 29/06* | (2006.01) |
| *B64D 29/08* | (2006.01) |
| *B64C 1/14* | (2006.01) |

(52) U.S. Cl.
CPC ............... *B64D 47/02* (2013.01); *B64C 1/14* (2013.01); *B64D 29/06* (2013.01); *B64D 29/08* (2013.01); *F01D 25/24* (2013.01); *F05D 2220/323* (2013.01); *F05D 2230/60* (2013.01)

(58) Field of Classification Search
CPC ......... F01D 25/24; B64D 29/06; B64D 29/08; B64D 47/02; B64C 1/14; F05D 2220/323; F05D 2230/60
See application file for complete search history.

(56) References Cited

U.S. PATENT DOCUMENTS

| 4,399,966 | A | | 8/1983 | Crudden et al. | |
|---|---|---|---|---|---|
| 4,613,099 | A | * | 9/1986 | Smith | B64D 29/06 244/129.4 |
| 5,518,206 | A | * | 5/1996 | Arnold | B64D 29/06 244/129.4 |
| 6,666,408 | B1 | * | 12/2003 | De Carvalho | B64D 29/00 244/129.4 |
| 9,470,107 | B2 | * | 10/2016 | Byrne | B64D 27/10 |
| 9,849,995 | B2 | * | 12/2017 | Bonneau | B64D 29/06 |
| 9,988,157 | B2 | * | 6/2018 | Lee | B64D 29/08 |
| 2016/0010502 | A1 | | 1/2016 | Byrne | |
| 2017/0240287 | A1 | | 8/2017 | Oonishi et al. | |

OTHER PUBLICATIONS

Extended Search Report for EP19382082.6, dated Jul. 22, 2019, 9 pages.

* cited by examiner

*Primary Examiner* — Ninh H. Nguyen
(74) *Attorney, Agent, or Firm* — Nixon & Vanderhye P.C.

(57) ABSTRACT

A system for warning an open state of a two-part fan cowl of an aeronautical structure, wherein the system includes at least one device arranged between these two parts of the fan cowl and adapted to exert force spacing them apart from each other, thus leaving a predefined gap between them at their lower ends when that two-part fan cowl is in the open state.

19 Claims, 8 Drawing Sheets

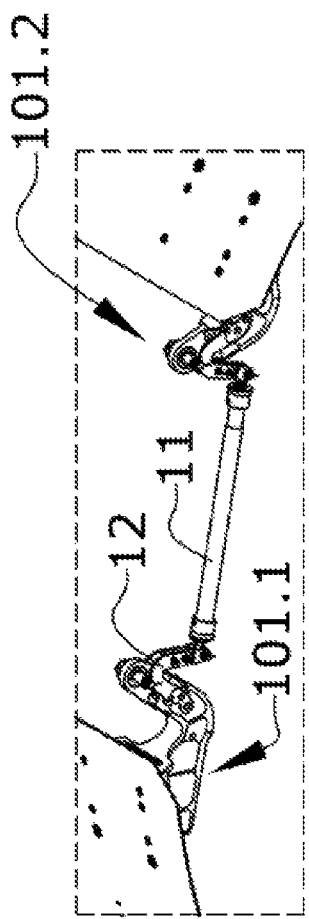
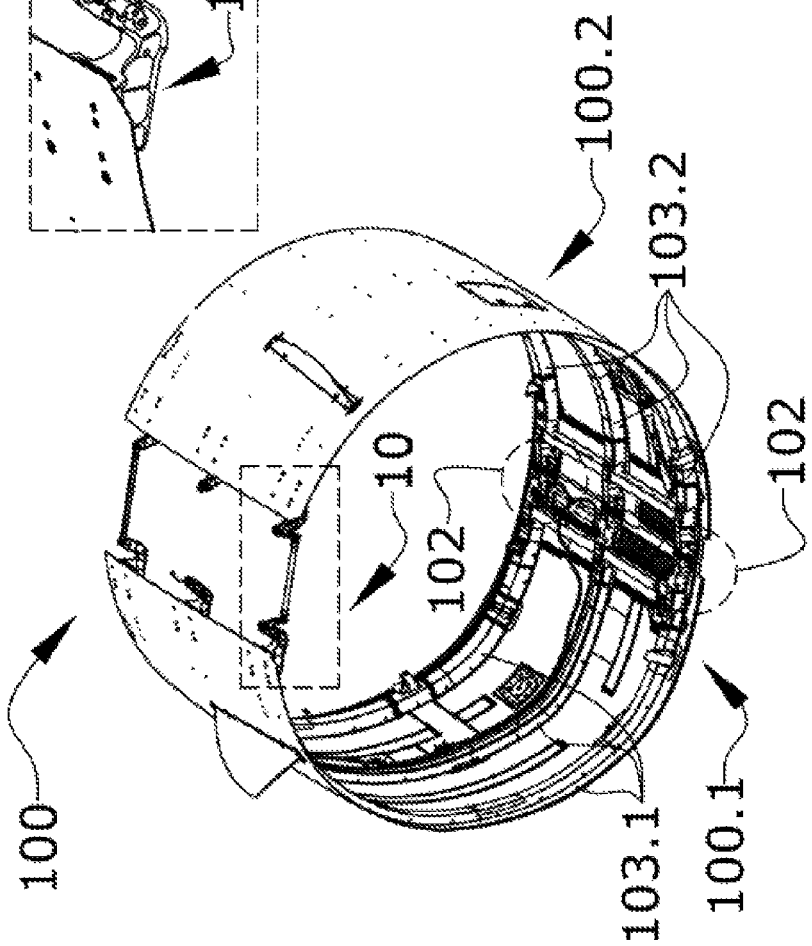
FIG. 1b
FIG. 1a

SYSTEM FOR WARNING AN OPEN STATE OF A TWO-PART FAN COWL

RELATED APPLICATION

This application claims priority to European Patent Application EP19382082.6, filed Feb. 5, 2019, the entirety of which is incorporated by reference.

TECHNICAL FIELD

The present invention belongs to the field of safety operation in aeronautics and relates to monitoring fan cowls for engine nacelles to confirm that they are securely locked. More specifically, the invention relates to warning systems to alert aircraft mechanics and other operators that a two-part fan cowl is in an open state.

BACKGROUND

Aircraft undergo periodic inspections, such as during aircraft maintenance checks. The inspections may be performed after certain periods of time or amount of usage of the aircraft. The periods or usage between inspections varies by aircraft type. The usage may be measured by a cycle count, where a cycle is a takeoff and a landing. The usage may also be measured by the number of hours flown since the last inspection. The inspections avoid or mitigate failures of aircraft systems during operation, both in-flight and on-ground.

To inspect certain components of an aircraft, such as an engine, the components and the housings, e.g., fan cowls, for the components may need to be opened. These components and housings need to be closed prior to the aircraft returning to flight operations. To avoid leaving components or their housings open after an inspection, it is conventional to verify, that an aircraft component and/or housing is closed before the aircraft returns to flight operations.

An engine fan nacelle is an example of an aircraft component that is inspect. A nacelle typically includes a two-part fan cowl articulated about upper hinge fittings. The parts of the fan cowl pivot outwards about the hinge fittings to allow access to the fan engine within the nacelle. During a maintenance operation, the two-part fan cowl is opened to allow access to the fan engine and associated equipment and subsystems housed within the nacelle. Once the maintenance task is done, the two-part fan cowl is closed. The closure is completed by latching together the latching units arranged alongside the bottom of the two-part fan cowl.

The latching units are mechanisms typically formed by paired latching members. Each latching member is arranged at the bottom of one of the parts of a two-part fan cowl. The latching members are brought together and interlocked to latch and close the parts of the fan cowl. Typically, the latching units may be a hook-keeper unit, a pin-latch unit, a hook-latch unit, or the like.

The latching members of a latching unit are latched to each other to hold the two-part fan cowl closed during operation of the aircraft. A non-proper closure of the latching unit may result if one or more pairs of latching members on a fan cowl are not totally engaged. A non-proper closure may happen due to an unintentional or inadvertent mistake of the operator closing the two-part fan cowl and latching the latching unit(s). If there is non-proper closure, there may be an accidental opening of a latching unit during aircraft takeoff or early during a flight. An accidental opening of a latching unit may result in a part(s) of the two-part fan cowling becoming detached during flight of the aircraft. The detached part of the cowl may impact the rear fuselage or horizontal/vertical tail plane ('HTP' or 'VTP') causing damage to other systems of the aircraft, while the aircraft is in flight.

To ensure proper closure of the latching units, a verification procedure is used before a flight to confirm that the latching units are properly closed. A warning system may alert operators to latching units not properly closed. The verification procedure includes a person, such as a mechanic, pilot or other aircraft personnel who walks around the nacelle to visually inspect the latching units and, if needed, close a latching unit and then manually disable any alert signal.

Most of aircraft fan engines are mounted beneath a wing of the aircraft. The latching units are typically located on the nacelle beneath the engine in a position close to the ground. Due to being near to the ground, it can be awkward for operators to access the latching mechanisms. The awkwardness increases the difficulty in inspecting and closing the latching units and investigating alert signals. Moreover, with the advent of new aircraft models whose fan engines have larger diameters, the problem of a narrow ground clearance between the nacelle and the ground increases the awkwardness of the operator verifying that the latching units are closed is increased. This problem is more pronounced in single-aisle aircraft which tend to have fan engines with fans that are proportionally larger than the fans in fan engines in wide-body aircraft models.

Typically, an engine nacelle includes a two-part fan cowl surrounding the fan case of a fan engine. An air inlet is at the foremost most end of the nacelle and fan. The nacelle encloses thrust reversers as well as fan engine components such as a turbine, combustor chamber(s), and a nozzle at the rear part of the fan engine which channels exhaust gases.

In most engine nacelles, the two-part fan cowl rest onto edges of the air inlet and thrust reversers in closed position. The set of air inlet and thrust reversers are commonly known in the related art as a nacelle landing. Details of an engine nacelle configuration are shown in FIG. 7. A person skilled in the art will recognize that the act of resting a part of the fan cowl onto the nacelle landing depends on the aircraft engine type, being equally valid resting onto the fan case, for instance, for another aircraft engine type. Hereinafter, all these equivalent configurations will be referred to as resting onto the fan engine.

An open state of the two-part fan cowl, i.e., a non-latched state of one or more of the latching units, leaves each part of the fan cowl hanging from a respective hinged fittings and resting onto the fan engine itself, particularly onto the nacelle landing. While, in the open configuration, the two-part fan cowl rests on the nacelle and may appear to be closed. This appearance of being closed creates a risk that an inspection of the two-part fan cowl would not identify the open condition.

To solve the problems associated with verifying that latching units are properly latched and a two-part fan cowl is closed, a variety of complex systems have been proposed which typically include highlighting a non-proper closure of the two-part fan cowl by an alert signal to notify ground personnel of an open latching unit or cowl. For instance, heavy and complex latching units cooperating with deployable mechanisms are common. These complex systems typically require expensive materials to withstand high fatigue cycles at which the deployable mechanisms are exposed. Accordingly, there is a need in the related industry for providing a simpler and more economic system able to advert to the operator an open state of the two-part fan cowl.

SUMMARY

The present invention may be embodied as system for warning an open state of a two-part fan cowl.

Each part of the two-part fan cowl includes: an upper end adapted to be pivotably fixed to at least one hinged fitting, and a lower end having a member of a latching unit. Each part of the fan cowl is hangs from a respective at least one hinged fitting. The non-latched and latched states of the latching unit define, respectively, open and closed states of the two-part fan cowl. The open state of the two-part fan cowl corresponds to a non-latched state of such at least one latching unit.

The invention may include at least one device arranged between the two parts of the fan cowl and adapted to exert a force on at least one of the parts to separate the parts apart and thus leave a gap between the lower ends (edges) of the parts while they are in an open state.

During the open state of the two-part fan cowl (triggered by a non-latched state of such at least one latching unit) each part hangs from a respective hinged fitting(s) which attaches the parts of the two-part fan cowl to the aircraft, such as to a pylon mounted a lower portion of a wing. In the prior art, the parts of a two-part fan cowl each rest on a nacelle landing which may hinder the operator because the open and close states are visually similar.

A system embodying the invention may include at least one device that exerts a force to separating the parts of a two-part fan cowl and thereby creating a space between the parts while they are in the open state. The force is overcome by closing the latching units. While the two-part fan cowl is in the open position, the force of the device creates a predefined gap between the lower ends (edges) of the parts of a two-part fan and gaps with respect to the fan engine itself, such as with respect to the nacelle landing. The gap is easily seen by an operator inspecting the lower edges of the parts and the gaps are a safety feature which alerts the operator of an open state of the fan cowl.

The invention may be embodied as a light-weight, simple and economical system that automatically acts to space apart respective parts of the fan cowl while the corresponding latching unit are unlatched. No manual operation is necessary to have the system create a space between the parts of the fan cowl while the latching unit(s) are unlatched.

The system may be passive which does not require deployable mechanisms. Such deployable mechanisms may have entailed expensive materials able to withstand high fatigue cycles. Due to their simplicity, embodiments of the invention may be advantageously installed on or in current two-part fan cowls and thus these embodiments may be retrofitable systems.

Further, the force to be exerted by an embodiment of the invention may be defined in terms of at least the following constraints: (i) weight of each part of the two-part fan cowl, (ii) position of their respective centers of mass, and (iii) distances of such centers of mass to the hinge line(s) of the device(s).

The distribution of mass of each part of the fan cowl when pushed by the at least one device of the embodiment of the invention leaves a predefined gap (known beforehand) at the lower ends of the parts of the fan cowl. The separation between parts and/or the rest of the nacelle due to the predefined gap is visible to an operator. The predefined gap may be in a range of 250 mm, such as 100 mm to 400 mm, or at least 200 mm.

An embodiment of the invention may be incorporated into a fan cowl without modifying an external surface of the fan cowl which is desirable in terms of lightning, fire, ventilation and aero-smoothness.

The at least one device may be further configured to be compressed upon bringing together the lower ends of the two parts forming the fan cowl, and is adapted to be kept compressed if the two-part fan cowl is in a closed state, that is, the at least one latching unit is in a latched state.

With an embodiment of the invention, the two-part fan cowl may be restored to the closed state (e.g. a state ready for flight) by bringing together the bottom ends (edges) of the two parts of the fan cowl (and overcoming the force applied by the system), and thereby reducing to zero the gap, by latching closed the latching units.

Some of the previous systems addressed above in the background require a final action by the operator to manually shut-down the alert signal. In contrast, a system embodying the present invention need not require such additional manual operation performed by the operator.

A device embodying the invention may be configured to be compressed by a single person operator who brings together the lower ends of the two parts forming the fan cowl. The device may be configured to apply a force which is sufficient to separate the lower ends (edges) of the parts of a two-part fan cowl and small enough that a single human operator may pull together parts and thereby overcome the force exerted by the device(s) embodying the invention. Due to the inherent mass distribution and configuration of the parts of the fan cowl, the force to be exerted by the single operator need only be about 20 times less than the force exerted by the device (s). Thus, the force(s) exerted by the devices(s) may be selected such that the force exerted by the operator is about 5% of such force(s). For example, device (s) on a two-part fan cowl may exert a force in a range of 2 to 3 kN.

Embodiments of the invention may save time of operators performing non-scheduled maintenance tasks, such as line maintenance tasks performed on-ground prior to flight which requires a quick and effective actuation from the operators to avoid excessive delays of takeoff.

An embodiment of the invention may further comprise a warning indicator arranged on at least one part of the two-part fan cowl which become appreciable in case this at least one part separates from the fan, being such two-part fan cowl in open state. The warning indicator may be on a side edge of at least one of the parts, wherein the side edge extends between the upper and lower ends of the parts. The warning indicator may be a colored zone, e.g., red, or orange, that is visible while the two-part fan cowl is in an open state. The side edges of the parts are visible while the two-part fan is in an open state because, at least in part, the device embodying the invention applying a force to the parts to cause the parts to swing outward.

A two-part fan cowl typically has a shape that follows the fan case contour and rests on the nacelle landing while in a closed state. When the latching units are opened, the force, e.g., a push force, exerted by the at least one device of the system embodying the invention separates at least one of such parts from such fan contour to create a visible gap between the part and the nacelle landing. The gap between the fan cowl part and the nacelle landing is a warning indicator arranged visible to operators inspecting the fan cowl. Thus, this embodiment of the invention improves the detectability an undesirable open state of the two-part fan cowl by an operator.

Other indicators of an open state of a fan cowl may be used with embodiments of the invention. Other indicators may include a pair proximity sensors inside of any part of the fan cowl (at least the same where the device(s) is arranged) and the corresponding spot of the fan case or nacelle contour in such a way that a lateral gap triggers a signal either sound or electric to a remote system.

To enhance the visibility of the separation of the parts of the two-part fan cowl or the separation from the rest of the nacelle, a side edge of the part(s) may be painted with a bright color, such as red, orange or yellow. The internal part is visible by looking from outside the fan cowl seeing an exposed side edge of the part. Due to the bright color, the separation of the part(s) is more visible to an operator inspecting the fan cowl. As an alternative to paint, the bright color may be achieved by a colored film, such as a vinyl, applied to the internal part. The bright colors of an internal part is a light-weight, passive, simple and inexpensive approach to improving the warning function of an open state of a two-part fan cowl.

In a reference system of a transverse section of the two-part fan cowl where the device embodying the invention is located at zero degrees (0°), which is at the top of the fan cowl and the latching unit is at 180°, which is at the bottom of the fan cowl. The force to be exerted displaces the parts of the fan cowl of about two inches, e.g, 25.4 mm, at both 90° and 270° locations on the fan cowl. A two inch separation is sufficient for the colored zone of the internal parts adjacent the gap to be visually appreciable by an operator performing conventional maintenance tasks.

The parts forming the two-part fan cowl comprise internal semi-circular transversal frames for stiffening the two-part fan cowl itself. These frames project from the internal face of respective parts. The colored zone may be arranged on at least one internal frame of the at least one part.

In a particular embodiment, the at least one device is at least one extensible bumper device arranged between the two parts of the fan cowl and adapted to be secured to at least one of the hinged fittings at which force is exerted.

Advantageously, by securing such bumper at both parts of the fan cowl, the needed force to be exerted by the same is therefore less than being only secured to one part.

In addition, the device according of this embodiment is out of the maintenance personnel (i.e. operators) working area and, therefore, it does not disturb other maintenance task, and is less subject to accidental damages.

In a particular embodiment, the device is at least one extensible bumper device that is adapted to be secured at its ends to the pair of hinged fittings of the two-part fan cowl at the upper end.

The extensible bumper device has a default dimension, e.g. length. Once installed and under the weight of the parts, it shortens (i.e. get compressed) up to maintain spaced apart such parts of the fan cowl so that the predefined gap at their lower ends is left. Finally, upon bringing together these two parts of the fan cowl, the already shortened extensible bumper gets more compressed and is kept with such dimension as long as the two-part fan cowl is in the closed state.

The bumper device shall be extensible because in the 'fully opened state' where maintenance tasks are performed by operator, its length is greatly increased as the parts rotate upwards.

The extensible bumper may have resilient properties so as to recover its original dimension if uninstalled.

In a particular embodiment, the at least one extensible bumper device further comprises two adaptor fittings, each adaptor fitting adapted to be securely fixed to one hinged fittings to which force is exerted allowing the extensible bumper device to relatively move in case only one or both parts of the two-part fan cowl is separated from the fan.

Advantageously, the use of adaptors improves the capacity of the system to be retrofitable among different fans, each having different upper hinge fittings for articulating the aperture of the parts.

In a particular embodiment, each adaptor comprises a double "U"-shaped plate with at least one attachment means at both ends to be securely fixed to both the hinged fitting and to an extension plate, and such extension plate which in turn comprises a rotatable attachment to be joined to the extensible bumper device.

This embodiments of the invention attain an easy and quick manner to adapt the present system to particular two-part fan cowl architecture since both parts allows relative displacement there between, being then fixed in correct position by the attachment means.

The at least one device may be one of the following types: a coil or helical spring, and/or a disc-shaped spring such as a Belleville washer or spring, and/or a gas spring, and/or a shock-absorbing device made of elastomer, and/or a wave spring. These types of extensible bumper devices can obtain a wide range of loads/forces to be exerted to any (or both) of the parts. In addition, in comparison with prior art solution of latching units cooperating with deployable mechanisms which attained around 2.6 Kg weight, the present invention is lighter as only attains 1.8 Kg or slightly more depending on the final bumper-type device.

The at least one device may be of the coil or helical spring-type because of the robustness and maturity level of this technology. Also, with this type, degradation is less severe even considering that constant lubrication or any other maintenance tasks are normally avoided, as well as their operation is not affected by temperature conditions as occurs, for example, with pneumatic-type.

The at least one device may be a pneumatic-type device, which is applicable if space is limited.

In a second inventive aspect, the invention provides a two-part fan cowl comprising two parts, wherein each part includes an upper end adapted to be rotatable fixed to at least one hinged fitting, and a lower end including a member of a latching unit, wherein the non-latched or latched states of the latching unit defines the open or closed state of the two-part fan cowl, respectively. In the open state, each part of the two-part fan cowl is unlatched at the lower end and hangs from a respective at least one hinged fitting; the two-part fan cowl further comprising a system according to any of the embodiments of the first inventive aspect.

If a member is installed on one part of the fan cowl, the corresponding paired member shall be installed on the other part so that the latching unit can be easily latched/un-latched by operators. In addition, the expression that the latching unit is configured to be in a latched state and in a non-latched state means that the pair of members are configured to be either engaged or non-engaged depending on the closure or aperture of the two-part fan cowl, accordingly.

In a particular embodiment, when the two-part fan cowl comprises three pairs of hinged fittings at its upper end, the system in turn comprises a unique extensible bumper device secured to any of such hinged fittings for exerting force.

In a particular embodiment, the at least one latching unit comprises a pair proximity sensor-target configured to match when the latching unit is in the latched state.

Advantageously, this allows a redundant safety system for advert the state of two-part fan cowl. The proximity sensor and target are able to cope with the other, transmitting the signal according to the position of its counterpart.

In a particular embodiment, the proximity sensor is configured to send a signal with the state of the latching unit to a remote system by a connection, preferably an electrical connection The signal may be sent to a notice panel in the cockpit of the aircraft to be visible by the pilots. The notice panel may present a visible notice to the pilot(s) the current state, e.g., open or closed, of the fan cowl. More preferably, the connection may be electrical by a harness, contactless, or the like.

In a third inventive aspect, the invention provides a method of installing a system according to any of the embodiments of the first inventive aspect into a two-part fan cowl for warning an open state thereof, wherein the method comprises providing the two-part fan cowl which comprises two parts, in turn each of these parts: (i) at an upper end, the part is adapted to be rotatable fixed to at least one hinged fitting, and (ii) at a lower end, the part comprises a member of a latching unit, the non-latched or latched states of which define the open or closed state of such two-part fan cowl, respectively, such that the open state of the two-part fan cowl corresponds to a non-latched state of such at least one latching unit, each part of the fan cowl left hanged from their respective at least one hinged fitting; providing the system at least comprising at least one device; and arranging such at least one device of the system between the parts of the two-part fan cowl in a manner that this at least one device exerts force over at least one of these parts causing it spacing apart from the other, and leaving a predefined gap between them at their lower ends.

In a particular embodiment, when the system to be installed further comprises a warning indicator (e.g. a colored zone) to be arranged on the at least one part of the two-part fan cowl which become (visually) appreciable in case at least one part separates from the fan, being such two-part fan cowl in open state, the method further comprising arranging a warning indicator on the at least one part of the two-part fan cowl in a way that it becomes appreciable in case at least one of the parts of the two-part fan cowl separates from the fan.

In a particular embodiment, the warning indicator is a colored zone and the at least one part of the two-part fan cowl comprises at least one internal frame, the method comprising the step of: arranging the colored zone on the at least one internal frame of the at least one part in a way that it becomes appreciable in case such at least one part separates from the fan.

In a fourth inventive aspect, the invention provides an aircraft engine, such as a fan, comprising a two-part fan cowl according to any of the embodiments of the second inventive aspect.

All the features described in this specification (including the claims, description and drawings) and/or all the steps of the described method can be combined in any combination, with the exception of combinations of such mutually exclusive features and/or steps.

SUMMARY OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

FIG. 1a shows a perspective view of a two-part fan cowl comprising at least one device according to the invention.

FIG. 1b is a detailed perspective view of the device as shown in a dotted box in FIG. 1a.

FIGS. 4a to 4c shows a two-part fan cowl according to the invention in three different configurations, wherein FIG. 4a shows a closed state, FIG. 4b shows an open state, and FIG. 4c shows a fully opened state during which maintenance tasks are performed.

DETAILED DESCRIPTION

Hereinafter, described aspects of the present invention may be embodied either as a system (10), a two-part fan cowl (100) comprising such system (10), a method of installing such system (10), or as an aircraft engine with a two-part fan cowl (100) that includes the system (100).

FIG. 1a depicts a perspective view of a two-part fan cowl (100) comprising at least one system (10) embodying the invention. In a dotted line box, FIG. 1a shows an enlarged view of the system (10) which includes a device (11) spanning between the upper ends (edges) of the parts of the fan cowl.

Figure 7:
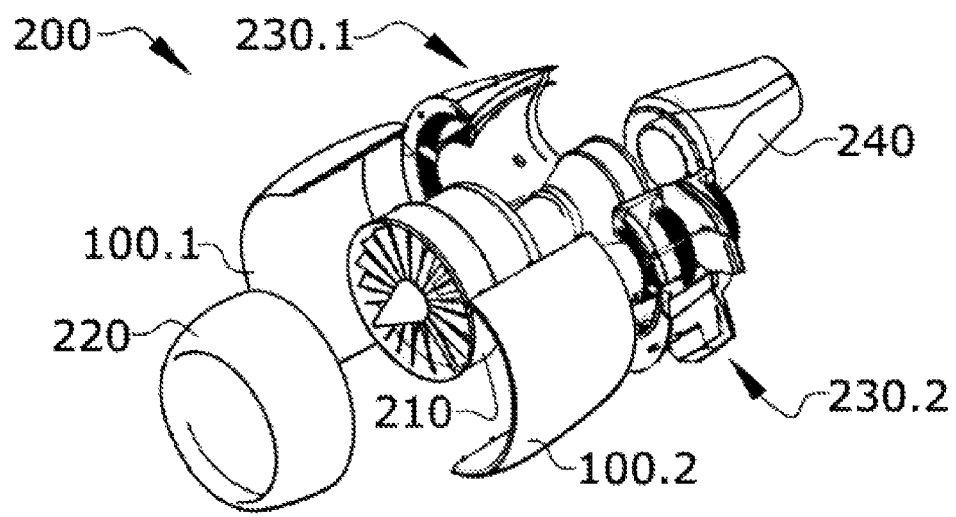
FIG. 7 shows an exploded schematic aircraft engine, such as a fan, comprising a two-part fan cowl which further comprises at least one device according to the invention.

The two-part fan cowl (100) together with a nose cowl and thrust reverser cowl form a fan cowling (which are shown in FIG. 7). The two-part fan cowl (100) may form a portion of a hollow annular casing for an aircraft engine, such as a turbofan engine. Each part (100.1, 100.2) of the two-part fan cowl may form a left-half or right-half of the fan cowl wherein the two parts separate along a vertical plane parallel to an axis of the two-part fan cowl and/or the engine. Each part (100.1, 100.2) may have an upper end (edge) parallel to the axis and a lower end (edge) parallel the axis. In the embodiment shown in FIG. 1, the device (11) is aligned with a gap between the upper edges of the parts (100.1, 100.2). In particular, the device (11) is aligned with the gap and radially inward of upper ends of the parts of the two-part fan cowl. The upper ends of the parts of the two-part fan cowl are secured, for example, to a pylon mounted by hook-keeper units 101.1, 101.2, to the underside of a wing and configured to support the nacelle and turbofan engine. The upper ends may remain separated by the gap while the lower ends of the parts of the two-part fan cowl and are opened and closed.

The two parts (100.1, 100.2) of the fan cowl (100) are articulated by pairs of upper hinge fittings (see hook-keeper units 101.1, 101.2 which form the upper hinge fittings) to allow the parts of the fan cowl to swing open. At the bottom of the parts of the fan cowl one or more latching units, e.g., a set of hook-keeper units (102), are spatially arranged to secure closed the lower ends (edges) of the parts (100.1, 100.2) of the two-part fan cowl.

FIG. 1 shows a closed state of the two parts (100.1, 100.2) facing each other and latched by means of their hooks (101.1) and keepers (101.2) which forms part of the hook-keeper unit (102). Other types of latching units may be used instead of the hook-keeper units (101.1, 101.2) herein exemplified.

FIG. 1a depicts the system (10) at the upper ends of the parts of the two-part fan cowl. The system (10) includes a device (11), such as an extendible or telescoping bumper rod, which may be spring (11.2) biased to extend. The device (11) is arranged between the upper ends of the two parts (100.1, 100.2) of the fan cowl. The spring (11.2) may be one or more of: coil or helical spring; a disc-shaped spring; a Belleville washer or spring; a gas spring; a shock-absorber; and a wave spring.

The two parts of the fan cowl exert a compression on the device (11). The compressive force is greatest while the fan-cowl is in a closed state and the lower ends of the two-parts are properly latched together. While the fan cowl is in the closed state, the compressive force applied by the parts of the fan cowl to the device (11) is enough to displace the device into a shortened state. While the fan cowl is in an open state, the spring bias force of the device (11) extends the device and thereby creates a predefined gap between the bottom ends (edges) of the parts (100.1, 100.2) of the two-part fan cowl, while the latching units are in an open state. The open state may be due to one or more of the latching units being unlatched.

The predefined gap is closed by the clamping force of the hook-keeper unit (101.1, 101.2) when in a latched closed position. FIG. 1 shows the two-part fan cowl in a close state. When the hook-keeper units (101.1, 101.2) are in a latched closed state, the lower edges of the parts (100.1, 100.2) of the fan cowl are brought together and the device(s) (11) is compressed into a closed state.

Each part (100.1, 100.2) of the two-part fan cowl (100) may comprise a plurality of internal semi-circular transversal frames (103.1, 103.2) for stiffening the two-part fan cowl. These frames project from the internal face of the skin of the respective parts (100.1, 100.2) and are configured to abut the nacelle landing of the fan engine when the two-part fan cowl is in the closed state.

Although there are multiple hinge fittings (see 101.1, 101.2), such as three, in the two-part fan cowl (100), only one device (11) has been installed. However, multiple devices (11) may be installed in a two-part fan cowl.

FIG. 1b is a detailed view of the system (10). The device may be an extensible bumper device (11) secured to a pair of hinged fittings (101.1, 101.2) of the two parts (100.1, 100.2) of the fan cowl at which force shall be exerted.

More particularly, the extensible bumper device (11) includes two adaptors (12) each fixedly secured to a respective one of the hinged fitting (101.1, 101.2). Alternatively, the extensible bumper device (11) may be pivotably fixed to the adaptors (12) for allowing its relative movement in respect of the parts (100.1, 100.2).

Figure 2:
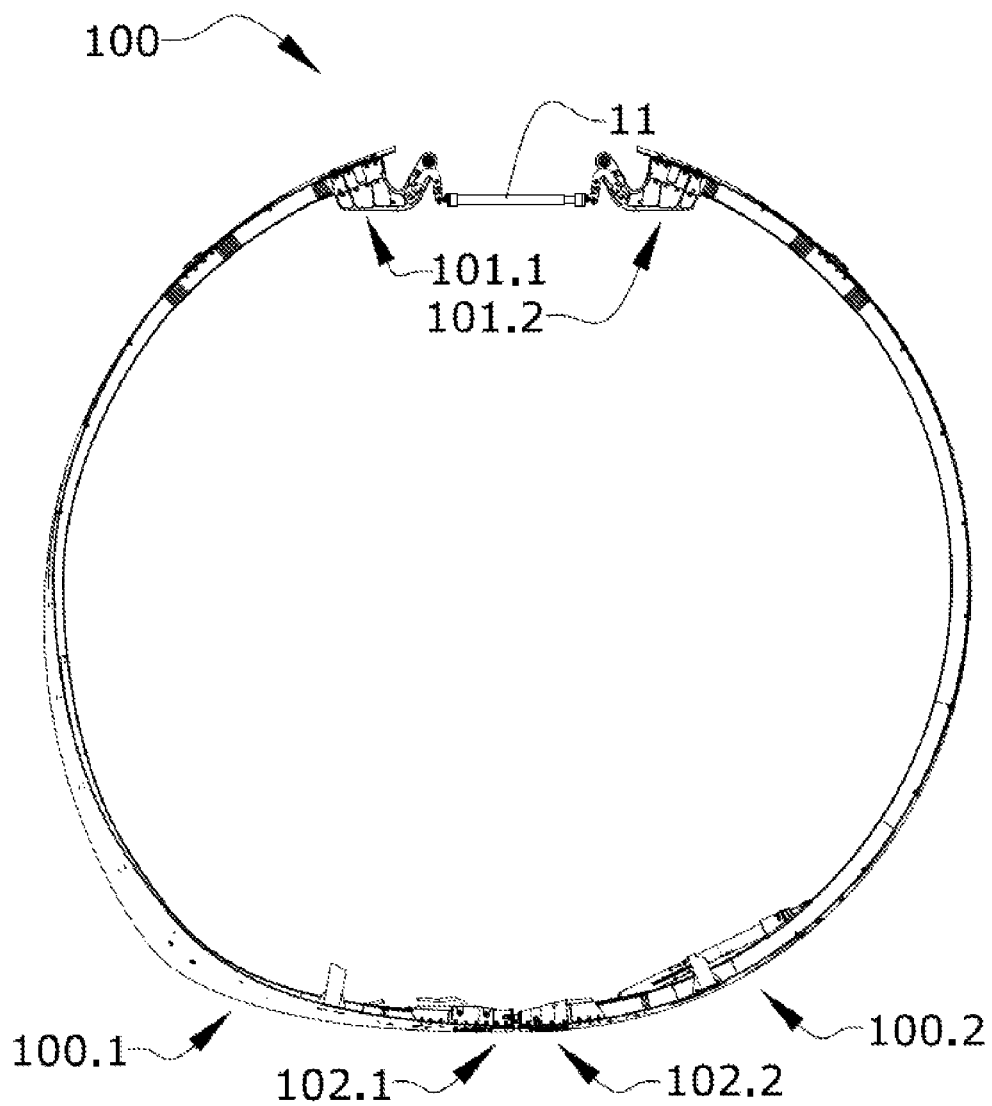
FIG. 2 shows a front view of a two-part fan cowl comprising at least one device according to the invention.

FIG. 2 depicts a front view of a two-part fan cowl (100) in an open state (the predefined gap at the lower ends of the parts being around 250 mm) comprising one extensible bumper device (11) where the corresponding adaptors (12) are not shown. Bringing the two parts (100.1, 100.2) together shortens the length of the bumper device (11); while when the two parts (100.1, 100.2) are fully opened for performing maintenance tasks, the bumper device (11) will be stretched. Thus, the extensible bumper device (11) should have resilient properties in order not to collapse under such length changes.

Figure 3A:
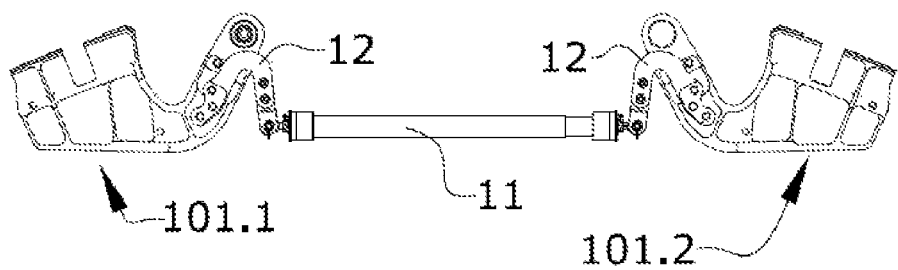
FIG. 3a shows a schematic view of a device arranged between the two parts of the fan cowl.
Figure 3B:
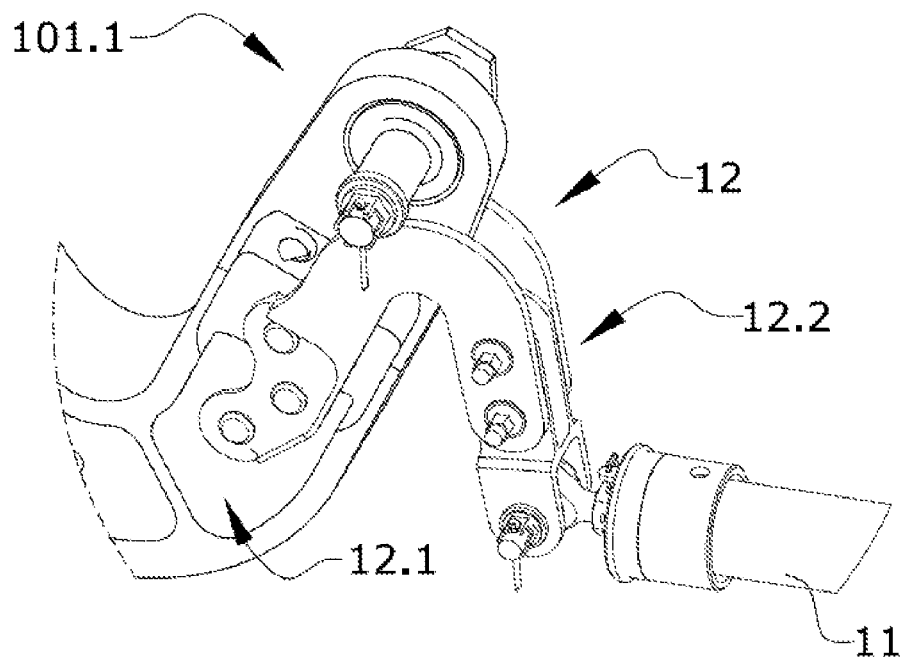
FIGS. 3b and 3c show detailed views of embodiments of adaptors interposed between the device and the hinge fitting.
Figure 3C:
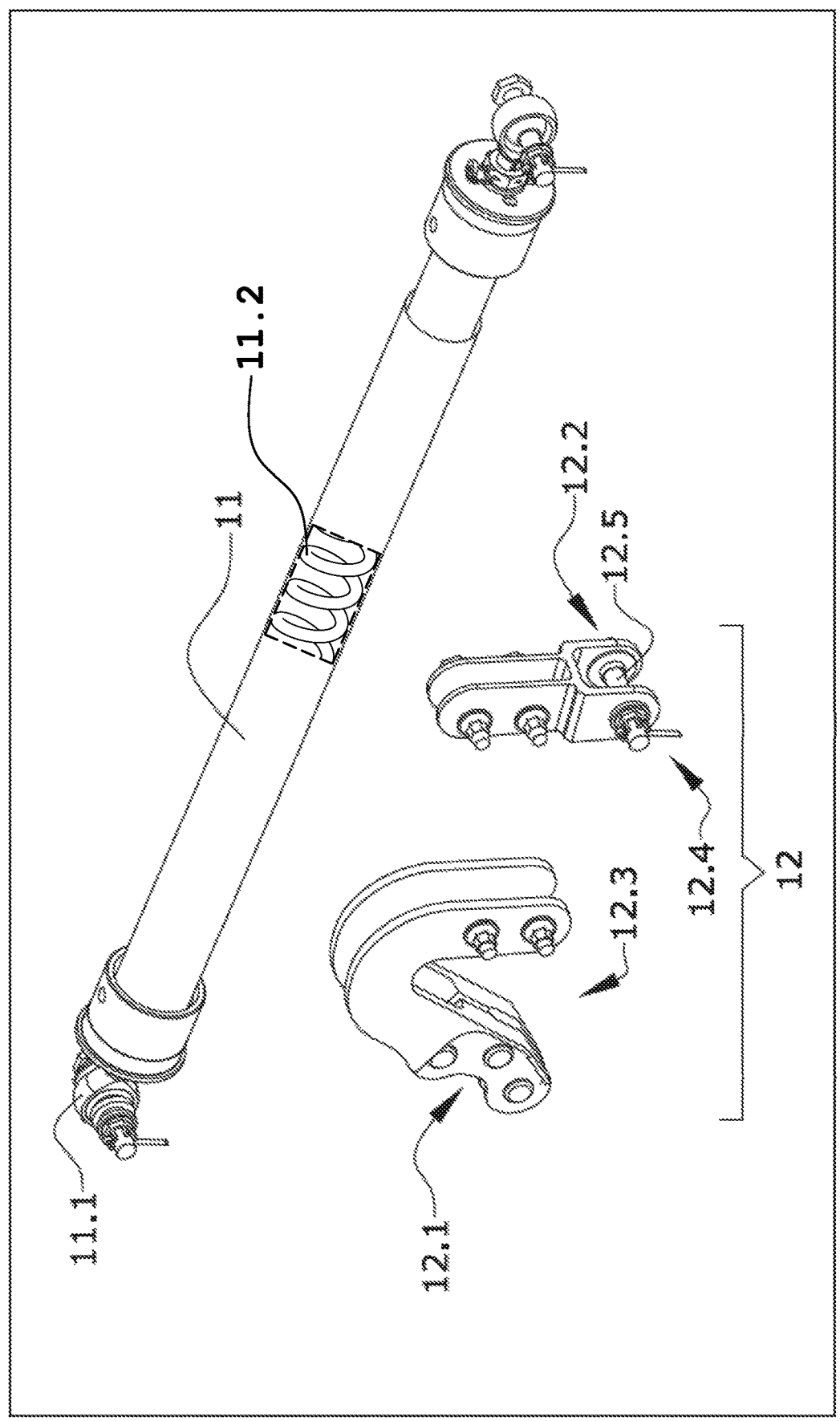

FIGS. 3a to 3c depict schematic views of the bumper device (11) arranged between the two parts (100.1, 100.2) of the fan cowl, and a detailed view of the adaptor (12) interposed, respectively.

Each adaptor (12) may have a first portion (12.1) with a number of attachment fasteners to be securely fixed to a hinged fitting; whilst, at the opposite end, a second portion (12.2) of the adaptor (12) comprises a rotatable attachment to be joined to a suitably end of the extensible bumper device (11) as can be seen in FIG. 3b. The first portion (12.1) of the adaptor may be a double inverted-U shaped bracket fixed at one end to an arm of one of the hinged fitting (101.1, 101.2) and coupled to the second portion (12.2) at an opposite end of the first portion. As the arm of the hinge fitter pivots about an upper pin attached to a mount in a pylon and outward to open a part of the fan cowl, the arm swings outward and thereby moves outward adaptor (12). Similarly, the spring bias force of the extensible bumper device (11) pushes outward the arms of hinged fitting (101.1, 101.2) to slightly open the unlatched parts of the fan cowl and thereby form the predefined gap between the lower ends of the parts. The first portion (12.1) may be fastened to the second portion As shown in FIG. 3c, each adaptor (12) may be assembled from an installation kit comprising: the first portion (12.1) in the form of a double inverted U-shaped plate (12.3) with attachments to be securely fixed to one of the hinged fitting (101.1, 101.2); and the second portion (12.2) formed by an extension bracket (12.4). The extension bracket (12.4) receives a pin (12.5) to be joined to the extensible bumper device (11). Each end of the extensible bumper device (11) includes is a pivotable annular socket (11.1) that receives the pin (12.5) attached to the extension bracket (12.4).

The bumper device (11) may include an internal spring which biases the telescoping bumper device towards an extended (open) position. The spring may be a helical spring internal to a hollow, telescoping bumper device.

Figure 4A:
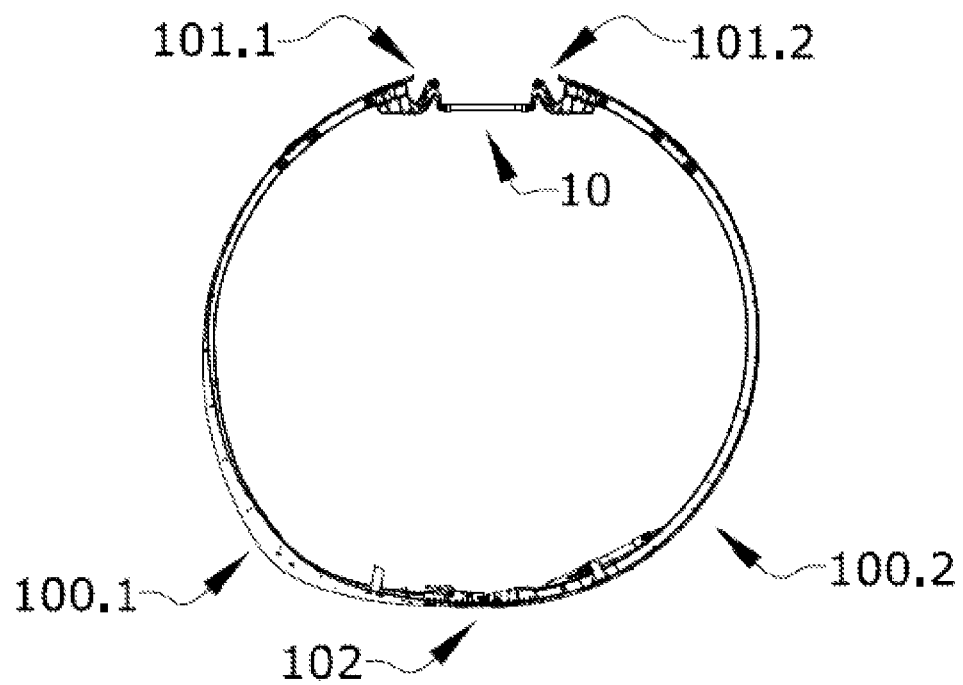
Figure 4B:
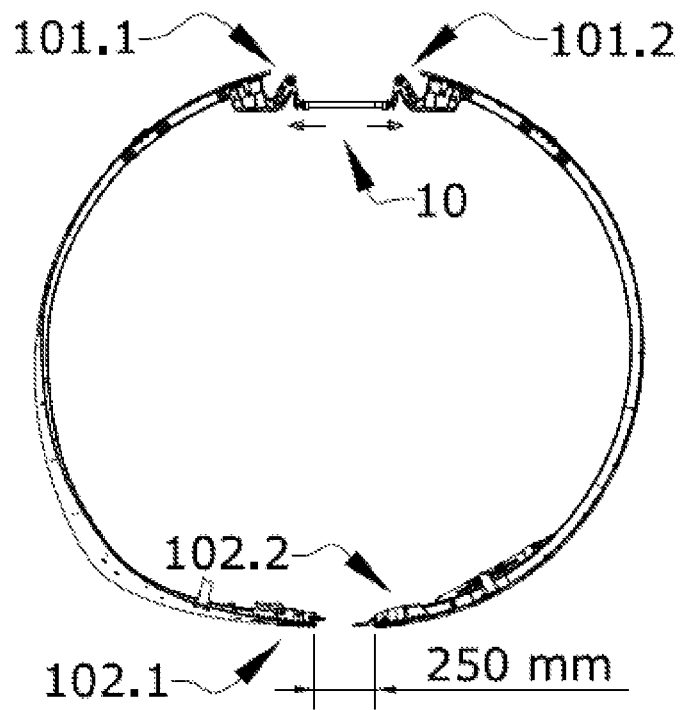
Figure 4C:
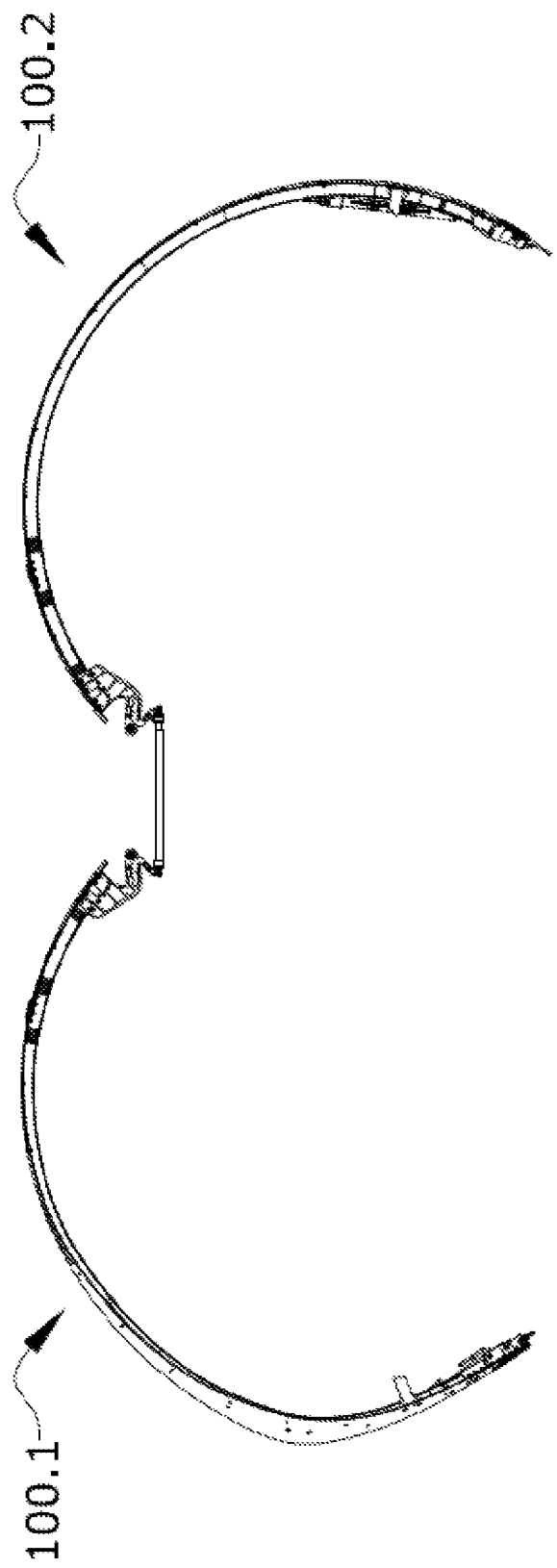

FIGS. 4a to 4c depict the two-part fan cowl (100) in three different configurations: FIG. 4a shows a closed state, FIG. 4b shows an open state in which the bottom ends of the parts of the fan cowl are separated by a predefined gap imparted by the bumper device (11), and FIG. 4c shows an open state in which the parts of the fan cowl are swung open to allow inspection of the engine and other components housed in the nacelle having the two-part fan cowl. Further, in the state (c), that is, the fully opened state, external equipment such as rigid hoisting bars may be used to keep the parts (100.1, 100.2) in the respective configurations.

In the open state shown in FIG. 4b, the predefined gap left between the parts (100.1, 100.2) at their lower ends may be about 250 mm, e.g., between 200 mm and 300 mm. the predefined gap is due to the extensible bumper device (11) being in its extended position and the latching units being unlatched. As shown in FIGS. 4a and 4b, an actual configuration change takes places between the closed state (FIG. 4a) and the open state (FIG. 4b). In contrast, in some of the prior art a two-part fan cowl (100) may have unlatched latching units and the lower ends of the parts of the fan cowl resting on the fan engine itself such that its configuration is similar to the closed state.

While the gap between the lower ends of the parts of the two-part fan cowl is greater than the predefined gap, e.g., about 250 mm, the extensible bumper device (11) may be configured to not to exert a force either positive or negative to the parts (100.1, 100.2).

Figure 5C:
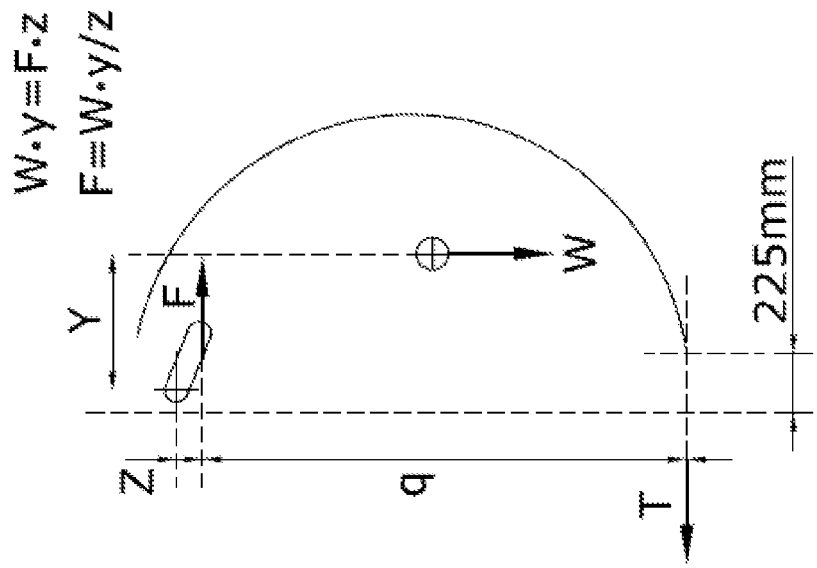
FIGS. 5a to 5c show the movement of a two-part fan cowl upon unlatching the latching unit(s), from being in a closed state shown in FIG. 4a and an open state shown in FIG. 4c.
Figure 5B:
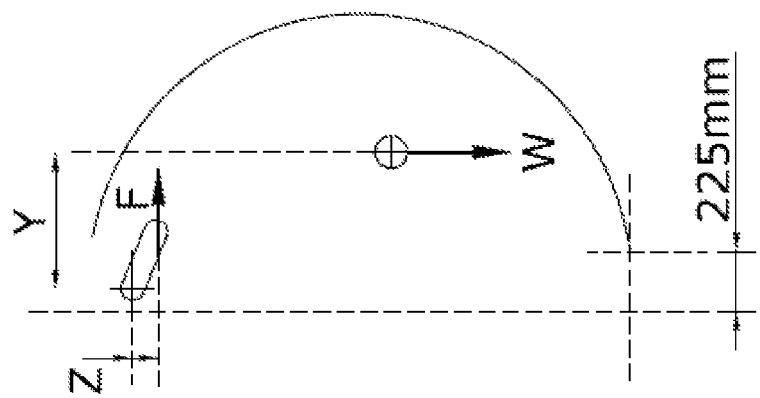
Figure 5A:
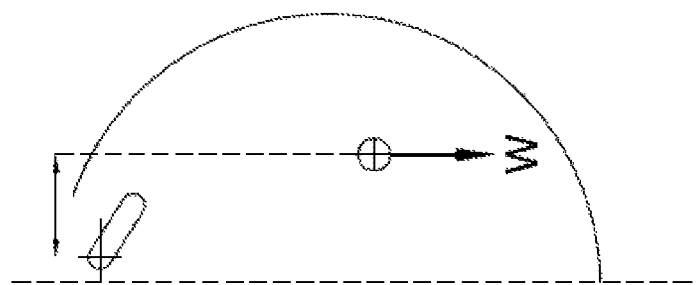

FIGS. 5a to 5c depict the movement of a schematic two-part fan cowl (100) upon unlatching the hook-keeper unit(s), from being in a closed state (a) towards an open state (b). It is to be noted that only one half of the two-part fan cowl (100) (this is, one part 100.1, 100.2-) is represented of both parts, wherein the other part is a mirror of the shown part. A line of a symmetry running vertically.

When the latching units are unlatched, the parts of the fan cowl transition from a closed state (FIG. 5a) to an open state (5b) primarily due to the force of gravity acting on each part (100.1, 100.2) and the force exerted by the extensible bumper device (11). The parts each pivotably hang from an articulated upper point on, for example a wing pylon, and is connected to one of the hinged fittings (101.1, 101.2).

The force exerted by the extensible bumper device (11) is defined, e.g., selected, based on at least the following constraints: weight of each part (100.1, 100.2) of the two-part fan cowl, position of the respective centers of mass of each part, and distances of the centers of mass of the parts to both the device(s) (11) and the hook-keeper unit(s) (102).

The opening motion illustrated in FIGS. 5a to 5b is governed by the 'force sum law' of mechanics, which is: $W \cdot y = F \cdot z$ wherein 'W' represents the weight of the part, 'y' is the distance in y-axis (horizontal) between the rotation axis of the respective part (100.1, 100.2) and the position of its center of mass, 'F' the force exerted by such device (11), and 'z' the vertical distance between rotation axis of the part (100.1, 100.2) and the extensible bumper device (11) in z-axis.

As mentioned, 'y' and 'z' are as displacements in y-axis and z-axis, respectively, in a orthogonal coordinate system (10) where the x-axis is parallel to the longitudinal axis of the fan engine and z-axis runs along the hook-keeper unit (102) spot towards the hinge fitting (101.1, 101.2) spot (similar to the symmetry axis defined previously).

For exemplary purposes, representative values of each of the parameters are:
 'W' is 50 kg. representing the weight of each part,
 'y' is normally 500 mm, and
 'z' is normally 110 mm.

These representative values leave the force to be exerted by the device ('F') at about 2.226N (0.5 pounds).

The oblong circle shown in FIGS. 5a, 5b and 5c represent the schematic path of the extensible bumper device (11) from the closed position shown in FIG. 5a to the open position shown in 5b. Once the two-part fan cowl (100) is opened as show in FIG. 5b, the gap at their lower ends of the parts reaches 250 mm and the parts (100.1, 100.2) and bumper device (11) are in a condition of equilibrium of forces.

FIG. 5c schematically exemplifies the beginning of the restoration of the whole system into the closed state. The bumper device (11) may be configured such that a single operator can manually bring together the lower ends of the two parts forming the fan cowl and compress the bumper device. The balance of forces may be represented by the following equation of mechanics:

$T \cdot q = F \cdot z$ where 'F' represents the force exerted by the device (11), 'z' is the distance between rotation axis of the part (100.1, 100.2) and the extensible bumper device (11) in the z-axis, 'q' is the vertical distance from such position of the extensible bumper device (11) up to the hook-keeper unit position, and 'T' is the force to be exerted by the single operator in order to bring together such parts.

Because FIG. 5c is a representation of a half of the whole system, the force 'T' is for bringing just one of the parts (100.1, 100.2) to a closed system on the symmetry axis. Also, the sum of 'q' and 'z' is the actual vertical distance between the hinge fitting and the hook-keeper unit.

In an example, 'q' is 2.000 mm., the force to be exerted by the single operator is around 127N, that is, around 20 times less than the one exerted by the device (which was 2.226N).

Figure 6:
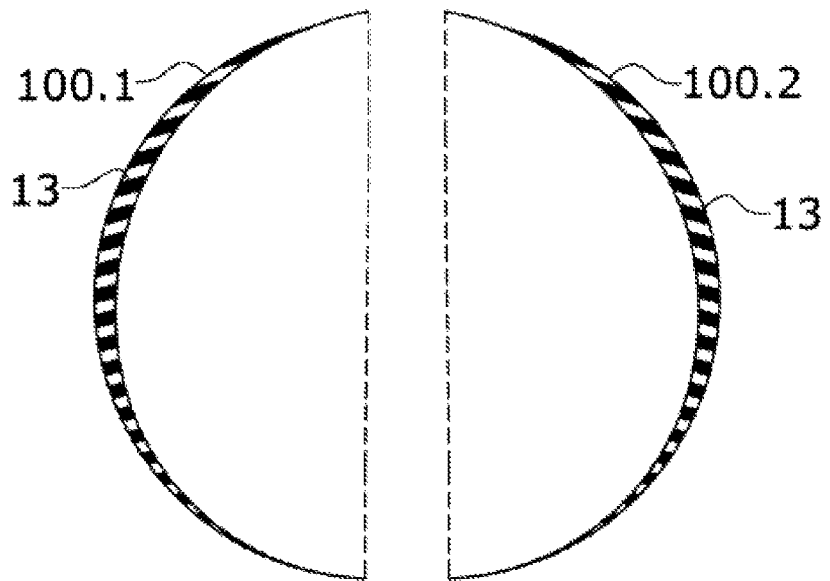
FIG. 6 shows a front view of a two-part fan cowl wherein the warning indicator arranged on the internal frame of the part is visually appreciable according to the invention.

FIG. 6 depicts a front view of a two-part fan cowl (100) wherein its parts (100.1, 100.2) have separated from the fan case or nacelle contour, allowing the warning indicator (13) being visually appreciable.

Warning indicator (13) are colored zone(s) of a film-type, such as colored in red and/or yellow (although the colors are not shown in these black-white figures) on an interior surface of the parts (1001.1, 100.2) such as on one or both side edges, e.g., a side of an internal fame, of one or both of the parts. The side edges are on opposite sides of a part and extend between the upper and lower ends of the part. The side edge(s) of a part extends beyond the rest of the nacelle when the two-part fan is in an open condition because, in part, extensible bumper device (11) the forces the parts apart. The colored warning indicator improves the visibility of an open condition by being easily visible even without the operator looking at the bottom of the two-part fan cowl.

A threshold of a two inch gap may be used as a measure of a gap that is safely visually appreciable by an operator or maintenance personnel. Therefore, the former formula for selecting the force to be exerted by the extensible bumper device (11) is selected to cause gaps of at least two inches between the parts (100.1, 100.2) and the fan contour at 90° and 270°. These gaps will allow the colored lined zone (13) on the inside surfaces of the parts to become visible during an inspection if the parts are in the open position.

FIG. 7 depicts a schematic aircraft engine (200), such as a fan engine, comprising a two-part fan cowl (100.1, 100.2) which further comprises a system (10) according to any of the FIGS. 1 to 6 (although not shown in this figure for illustrative purposes). Also for illustrative purposes, the two-part fan cowl (100) is not represented with the internal semi-circular transversal frames (103) or any other equipment.

This aircraft engine (200) comprises an engine nacelle formed by such two-part fan cowl (100.1, 100.2) surrounding the fan case (210), an air inlet (220) at the foremost, thrust reversers (230.1, 230.2) surrounding turbine and combustor chambers, and a nozzle (240) at the rear part for channeling exhaust gases.

As it was mentioned, the two-part fan cowl (100) rest onto the closest edges of the air inlet (220) and thrust reversers (230.1, 230.2) in closed position, which jointly form the 'nacelle landing' of the two-part fan cowl (100).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been

The invention claimed is:

1. A system configured issue a warning of an open state of a two-part fan cowl, wherein each part of the two-part fan cowl comprises:
   an upper end adapted to be rotatable fixed to at least one hinged fitting, and
   a lower end adapted to attach to a member of a latching unit, wherein a non-latched state of the latching unit defines an open state of the two-part fan cowl and a latched state of the latching unit defines a closed state of the two-part fan cowl; and
   the system further comprises at least one device arranged between the two parts of the fan cowl, wherein the at least one device applies a force to at least one of the two parts of the fan cowl to form a predefined gap between the lower ends of the parts of the two-part fan cowl when the two-part cowl is in the open state;
   wherein the at least one device is at least one extensible bumper device between the two parts of the fan cowl and adapted to be secured to the at least one of the hinged fittings.

2. The system according to claim 1, wherein the at least one device is adapted to be compressed by the parts of the two-part fan cowl while the latching unit is in the latched state.

3. The system according to claim 1, wherein the system further comprises a warning indicator on an surface of at least one of the parts of the two-part fan cowl, wherein the warning indicator is visible while the two-part fan cowl is in the open state and is not visible while the two-part fan cowl is in the closed state.

4. The system according to claim 3, wherein the warning indicator includes a brightly colored zone arranged on a side edge of the at least one part.

5. The system according to claim 4, wherein the colored zone is adapted to be arranged on at least one internal frame of the at least one part.

6. The system according to claim 1, wherein opposite ends of the at least one extensible bumper device are each adapted to be secured to a respective one of the hinge fittings.

7. The system according to claim 6, wherein the at least one extensible bumper device further comprises an adaptor fitting at each of the opposite ends of the at least one extensible bumper device, and each adaptor fitting is adapted to be securely fixed to one of the hinged fittings, wherein a force exerted by the at least one extensible bumper device is applied to each of the parts of the two-part fan cowl through the adaptor fittings.

8. The system according to claim 7, wherein each of the adaptor fittings includes:
   at least one inverted U-shaped plate having a first end section securely fixed to one of the hinged fittings, and
   an extension bracket fixed to a second end section of the at least one U-shaped plate, wherein the extension bracket includes a rotatable attachment to the extensible bumper device.

9. The system according to claim 1, wherein the at least one device includes one or more of:
   coil or helical spring;
   a disc-shaped spring;
   a Belleville washer or spring;
   a gas spring;
   a shock-absorber; and
   a wave spring.

10. A two-part fan cowl for a nacelle of an aircraft engine, the two-part fan cowl comprising:
    a first part and second part each forming a semi-cylindrical housing and separated by a vertical plane, wherein each of the first and second parts include an upper edge and a lower edge, wherein the upper edge is configured to be pivotably attached to a respective hinged fitting, and the lower edges are configured to be closed together by at least one hook-keeper unit while the two-part fan cowl is in a closed state; and
    an extendible bumper between the upper edges of the first and second parts and having opposite ends each configured to be pivotably attached to a respective one of the hinged fittings, wherein the extendible bumper includes a spring applying a bias force to extend the extendible bumper rod and thereby pivot outward the first and second parts to create a gap between the lower edges of the first and second parts, while the two-part fan cowl is in an open position.

11. The two-part fan cowl according to claim 10, wherein the ends of the extendible bumper are attached to a location on each of the respective ones of the hinged fitting displaced vertically from a pivot joint configured to attach the hinged fitting to an aircraft.

12. The two-part fan cowl according to claim 10, wherein the extendible bumper is a telescoping rod and the spring is internal to the extendible bumper and applies the bias force to push apart sections of the telescoping rod.

13. The two-part fan cowl according to claim 10, further comprising a brightly colored warning on at least one side edge of at least one of the first and second part.

14. A method to install a warning system on a two-part fan cowl for a nacelle of an aircraft engine for an aircraft, the method comprising:
    mounting upper edge regions of first and second parts of the two-part fan to respective hinged fittings on the aircraft, wherein the mounting allows the first and second parts to respectively pivot between open and closed positions;
    attaching each of opposite ends of an extendible bumper to a respective one of the hinged fittings such that the extendible bumper applies an expansion force to at least one of the hinged fittings to move at least one of the first and second parts outward to form a gap between the parts while in the first and second parts are not latched together; and
    latching together lower edge regions of the first and second parts to place the two-part fan cowl in the closed position, wherein the latching together includes latching mating latching units on each of the lower edge regions of the first and second parts.

15. The method according to claim 14, further comprising arranging a warning indicator on at least one of the first and second parts, wherein the warning indicator is visible while the two-part fan cowl is in the open position and not visible while the two-part fan cowl is in the closed position.

16. The method of claim 14, further applying a brightly colored warning on one or more of side edges of at least one of the first and second part, wherein the side edges each extend from the upper ends to the lower edge of the part.

17. The method of claim 14, wherein the ends of the extendible bumper are attached to a location on respective ones of the hinged fitting displaced vertically from a pivot joint configured to attach the hinge fitting to the aircraft.

18. The method of claim 14, wherein the extendible bumper is a telescoping rod and includes a spring is internal to the extendible bumper, wherein the spring applies a bias force to push apart sections of the telescoping rod.

19. The method of claim 14, wherein the extendible bumper applies the expansion force along an axis of the extendible bumper.

* * * * *